US010344668B2

United States Patent
Benjey et al.

(10) Patent No.: US 10,344,668 B2
(45) Date of Patent: Jul. 9, 2019

(54) BOOST SYSTEM INCLUDING HYBRID DRIVE SUPERCHARGER WITH COMPACT CONFIGURATION

(71) Applicant: Eaton Intelligent Power Limited, Dublin (IE)

(72) Inventors: Robert Philip Benjey, Dexter, MI (US); Vasilios Tsourapas, Northville, MI (US); Daniel R. Ouwenga, Portage, MI (US); Matthew Joseph Glass, Plainwell, MI (US); Brian Thompson Smith, Royal Oak, MI (US); Sara Rose McClellan, Lansing, MI (US)

(73) Assignee: Eaton Intelligent Power Limited, Dublin (IE)

( * ) Notice: Subject to any disclaimer, the term of this patent is extended or adjusted under 35 U.S.C. 154(b) by 146 days.

(21) Appl. No.: 15/210,023

(22) Filed: Jul. 14, 2016

(65) Prior Publication Data
US 2016/0319733 A1 Nov. 3, 2016

Related U.S. Application Data

(63) Continuation of application No. PCT/US2015/011339, filed on Jan. 14, 2015.

(60) Provisional application No. 61/927,362, filed on Jan. 14, 2014, provisional application No. 61/992,866, filed on May 13, 2014.

(51) Int. Cl.
*F02B 33/38* (2006.01)
*F02B 39/04* (2006.01)
(Continued)

(52) U.S. Cl.
CPC .............. *F02B 39/04* (2013.01); *B60K 6/485* (2013.01); *B60W 10/02* (2013.01); *B60W 10/06* (2013.01);
(Continued)

(58) Field of Classification Search
CPC ......... B60K 6/46; B60W 10/08; B60W 10/30; F02B 33/36; F02B 33/38; F02B 39/04;
(Continued)

(56) References Cited

U.S. PATENT DOCUMENTS

| | | |
|---|---|---|
| 1,752,224 A | 3/1930 | Apple |
| 1,878,210 A | 9/1932 | Vincent |

(Continued)

FOREIGN PATENT DOCUMENTS

| | | |
|---|---|---|
| DE | 32 05 721 A1 | 8/1983 |
| EP | 1 314 884 A2 | 5/2003 |

(Continued)

OTHER PUBLICATIONS

Extended European Search Report for Application No. 15736994.3 dated Sep. 13, 2017.
(Continued)

*Primary Examiner* — Patrick D Maines
*Assistant Examiner* — Dapinder Singh
(74) *Attorney, Agent, or Firm* — Merchant & Gould P.C.

(57) ABSTRACT

A boost system for providing boost pressure to an air intake manifold of an engine includes a supercharger having rotors and a supercharger input shaft, an electric motor/generator, and a planetary gear set. The planetary gear set operates to transfer torque between the supercharger input shaft, the electric motor/generator and a crankshaft of the engine. The boost system can have a compact configuration.

27 Claims, 17 Drawing Sheets

(51) Int. Cl.

| | | |
|---|---|---|
| F02D 23/00 | (2006.01) | |
| F01N 11/00 | (2006.01) | |
| F02B 39/10 | (2006.01) | |
| F02B 33/36 | (2006.01) | |
| F02N 11/00 | (2006.01) | |
| B60W 10/08 | (2006.01) | |
| F02N 11/04 | (2006.01) | |
| F02N 15/02 | (2006.01) | |
| F02D 41/00 | (2006.01) | |
| F02B 39/16 | (2006.01) | |
| B60K 6/485 | (2007.10) | |
| B60W 10/02 | (2006.01) | |
| B60W 10/06 | (2006.01) | |
| B60W 20/19 | (2016.01) | |
| F02D 9/02 | (2006.01) | |
| F02N 11/08 | (2006.01) | |
| F02N 15/00 | (2006.01) | |
| F02N 15/04 | (2006.01) | |
| F02N 15/08 | (2006.01) | |
| F16H 3/72 | (2006.01) | |

(52) U.S. Cl.
CPC ............ B60W 10/08 (2013.01); B60W 20/19 (2016.01); F02B 33/36 (2013.01); F02B 33/38 (2013.01); F02B 39/10 (2013.01); F02B 39/16 (2013.01); F02D 23/00 (2013.01); F02D 41/0007 (2013.01); F02N 11/003 (2013.01); F02N 11/04 (2013.01); F02N 15/02 (2013.01); B60Y 2400/435 (2013.01); F02D 2009/0283 (2013.01); F02N 11/0814 (2013.01); F02N 15/003 (2013.01); F02N 15/022 (2013.01); F02N 15/046 (2013.01); F02N 15/08 (2013.01); F16H 3/725 (2013.01); F16H 2200/0034 (2013.01); Y02T 10/144 (2013.01); Y02T 10/6226 (2013.01); Y02T 10/6286 (2013.01)

(58) Field of Classification Search
CPC .......... F02B 39/10; F02B 39/16; F02D 23/00; F02D 41/0007; F02D 2009/0283; F02N 11/003; F02N 11/04; F02N 15/02; F02N 15/003; F02N 15/022; F02N 15/046; F02N 15/08; F02N 11/0814; F16H 2200/0034; F16H 3/725; Y02T 10/144
USPC ........................................................... 60/608
See application file for complete search history.

(56) References Cited

U.S. PATENT DOCUMENTS

| | | |
|---|---|---|
| 2,402,547 A | 6/1946 | Gilfillan |
| 2,467,077 A | 4/1949 | Brunken |
| 2,965,083 A | 12/1960 | Percival |
| 3,180,079 A | 4/1965 | Freeman, Jr. |
| 3,391,584 A | 7/1968 | Glamann |
| 3,430,517 A | 3/1969 | Glamann |
| 3,603,853 A | 9/1971 | Mackay |
| 3,676,999 A | 7/1972 | Oldfield |
| 4,083,188 A | 4/1978 | Kumm |
| 4,478,043 A | 10/1984 | Kobayashi et al. |
| 4,489,242 A | 12/1984 | Worst |
| 4,729,225 A | 3/1988 | Bucher |
| 4,730,457 A | 3/1988 | Yamada |
| 5,121,607 A | 6/1992 | George, Jr. |
| 5,195,881 A | 3/1993 | George, Jr. |
| 5,241,817 A | 9/1993 | George, Jr. |
| 5,394,848 A | 3/1995 | Tsutsumi et al. |
| 5,442,918 A | 8/1995 | Baeuerle et al. |
| 5,713,204 A | 2/1998 | Kadlicko |
| 5,791,315 A | 8/1998 | Riach et al. |
| 5,875,766 A | 3/1999 | Ozawa et al. |
| 5,887,434 A | 3/1999 | Arnell et al. |
| 5,890,468 A | 4/1999 | Ozawa |
| 6,048,288 A | 4/2000 | Tsujii |
| 6,082,340 A * | 7/2000 | Heimark ................ F02B 33/40 123/559.1 |
| 6,537,169 B1 | 3/2003 | Morii |
| 6,631,702 B2 | 10/2003 | Tonnqvist et al. |
| 6,637,203 B2 | 10/2003 | Berglund |
| 6,666,194 B2 | 12/2003 | Wildner |
| 6,684,863 B2 | 2/2004 | Dixon et al. |
| 6,817,349 B2 | 11/2004 | Awasaka et al. |
| 6,845,832 B2 | 1/2005 | Takizawa et al. |
| 6,863,139 B2 | 3/2005 | Egami et al. |
| 6,907,867 B2 | 6/2005 | Igarashi et al. |
| 6,918,250 B2 | 7/2005 | Baeuerle |
| 6,922,995 B2 | 8/2005 | Kawamura et al. |
| 6,938,419 B2 | 9/2005 | Okuyama et al. |
| 7,000,601 B2 | 2/2006 | Yasui et al. |
| 7,102,304 B2 | 9/2006 | Sebille et al. |
| 7,488,164 B2 | 2/2009 | Swartzlander |
| 7,524,263 B2 | 4/2009 | Johnson et al. |
| 7,708,283 B2 | 5/2010 | Azibert et al. |
| 7,748,366 B2 | 7/2010 | Rollinger et al. |
| 7,765,806 B2 | 8/2010 | Clark |
| 7,805,937 B2 | 10/2010 | Cochet et al. |
| 8,151,773 B2 | 4/2012 | Prior |
| 8,196,686 B2 | 6/2012 | Grieve |
| 8,808,124 B2 | 8/2014 | Major et al. |
| 9,074,524 B2 | 7/2015 | Eybergen et al. |
| 2004/0178636 A1 | 9/2004 | Iwanami et al. |
| 2004/0237949 A1 | 12/2004 | Yasui et al. |
| 2006/0157036 A1 | 7/2006 | Andersen |
| 2007/0074701 A1 | 4/2007 | Mizutani |
| 2007/0137626 A1 | 6/2007 | Turner |
| 2008/0041323 A1 | 2/2008 | Clark |
| 2008/0194375 A1 | 8/2008 | Voigt et al. |
| 2009/0048745 A1 | 2/2009 | Wu et al. |
| 2010/0050998 A1 | 3/2010 | Ai et al. |
| 2010/0155157 A1 | 6/2010 | Grieve |
| 2010/0273597 A1* | 10/2010 | Wilson, Jr. ................ A62B 1/10 475/149 |
| 2011/0030641 A1 | 2/2011 | Wu et al. |
| 2011/0067395 A1 | 3/2011 | Suhocki |
| 2011/0083647 A1 | 4/2011 | Hansen et al. |
| 2011/0094480 A1 | 4/2011 | Suhocki et al. |
| 2011/0204654 A1 | 8/2011 | Hansen et al. |
| 2013/0146035 A1 | 6/2013 | Eybergen et al. |
| 2014/0224228 A1 | 8/2014 | Benjey et al. |
| 2015/0047617 A1 | 2/2015 | Benjey et al. |
| 2015/0066272 A1 | 3/2015 | Benjey et al. |
| 2015/0330295 A1 | 11/2015 | Walls et al. |
| 2015/0377158 A1 | 12/2015 | Benjey et al. |
| 2016/0001649 A1 | 1/2016 | Benjey et al. |

FOREIGN PATENT DOCUMENTS

| | | |
|---|---|---|
| JP | 60-1328 A | 1/1985 |
| JP | 60-1329 A | 1/1985 |
| JP | 2-188625 A | 7/1990 |
| JP | 3-179141 A | 8/1991 |
| WO | WO 2004/072449 A1 | 8/2004 |
| WO | WO 2006/134330 A1 | 12/2006 |
| WO | WO 2008/020184 A1 | 2/2008 |
| WO | 2009/014488 A2 | 1/2009 |
| WO | WO 2013/148205 A1 | 10/2013 |
| WO | WO 2014/165233 A1 | 10/2014 |

OTHER PUBLICATIONS

International Search Report for corresponding International Patent Application No. PCT/US2015/011339 dated May 8, 2015.

* cited by examiner

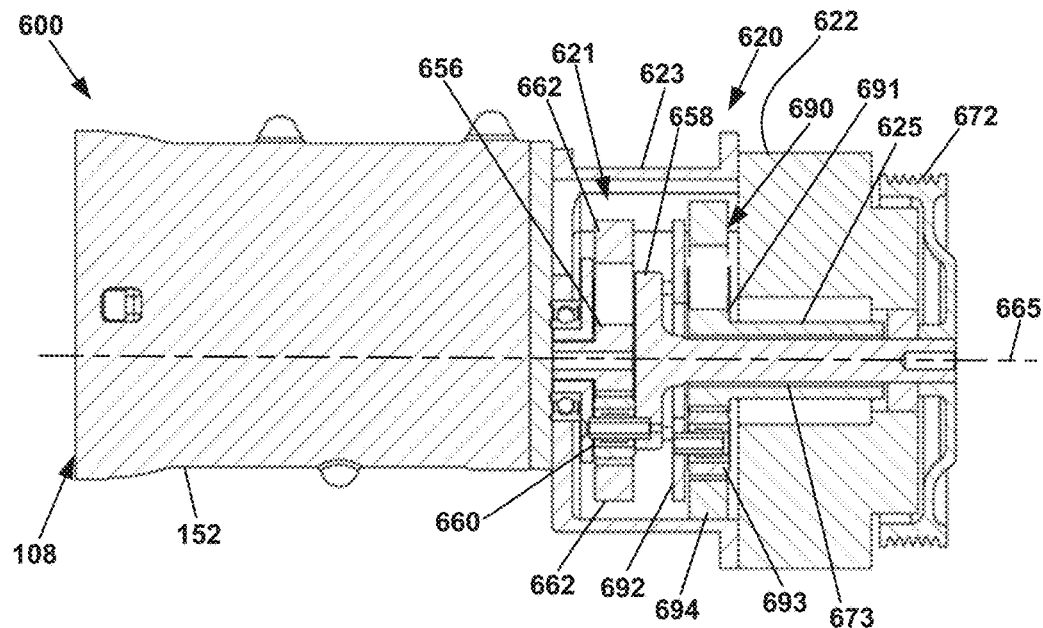
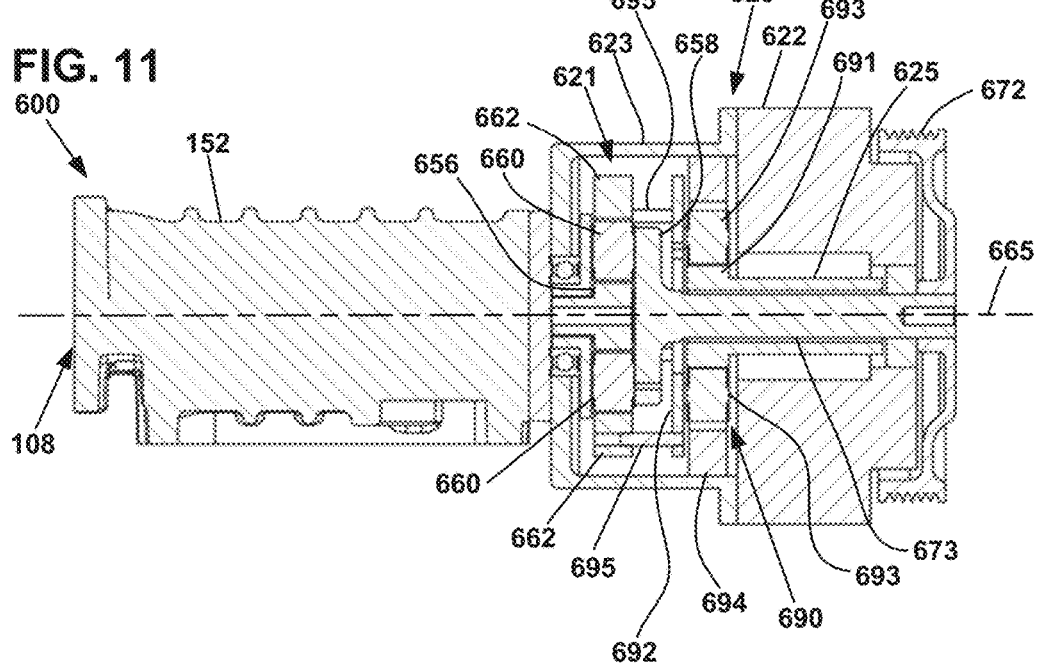

BOOST SYSTEM INCLUDING HYBRID DRIVE SUPERCHARGER WITH COMPACT CONFIGURATION

CROSS-REFERENCE TO RELATED APPLICATIONS

This application is a Continuation of PCT/US2015/011339, filed on Jan. 14, 2015, which claims benefit of U.S. Patent Application Ser. No. 61/927,362 filed on Jan. 14, 2014, and U.S. Patent Application Ser. No. 61/992,866 filed on May 13, 2014 and which applications are incorporated herein by reference. To the extent appropriate, a claim of priority is made to each of the above disclosed applications.

TECHNICAL FIELD

The present disclosure relates generally to systems for boosting engine intake air pressure to increase the torque available from the engine.

BACKGROUND

Energy efficient engines of reduced size are desirable for fuel economy and cost reduction. Smaller engines provide less torque than larger engines. To increase the torque capacity available from smaller engines, boosting systems have been developed for boosting the air pressure at the engine intake to increase the torque available from the engine. Conventional boosting systems can include superchargers and/or turbochargers.

SUMMARY

The present disclosure relates to an engine boosting system that uses a compactly packaged hybrid drive supercharger. The hybrid drive associated with the supercharger can be configured to enhance the efficiency of the supercharger by controlling the speed of the supercharger to reduce or minimize the excess flow generated by the supercharger under certain driving conditions and to provide increased boost under other driving conditions. In certain examples, the hybrid drive can include a gearing arrangement such as a planetary gear set that controls the transfer of torque between the engine crankshaft, an electric motor and the rotors of the supercharger. In certain examples, the supercharger is a Roots-style supercharger having a fixed displacement per each rotation of the rotors.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 10 is a cross-sectional view of a further boost system including a hybrid drive in accordance with the principles of the present disclosure for powering a supercharger, the cross-sectional view is taken along section line 10-10 of FIG. 17;

FIG. 11 is a cross-sectional view taken along section line 11-11 of FIG. 17;

DETAILED DESCRIPTION

Figure 1:
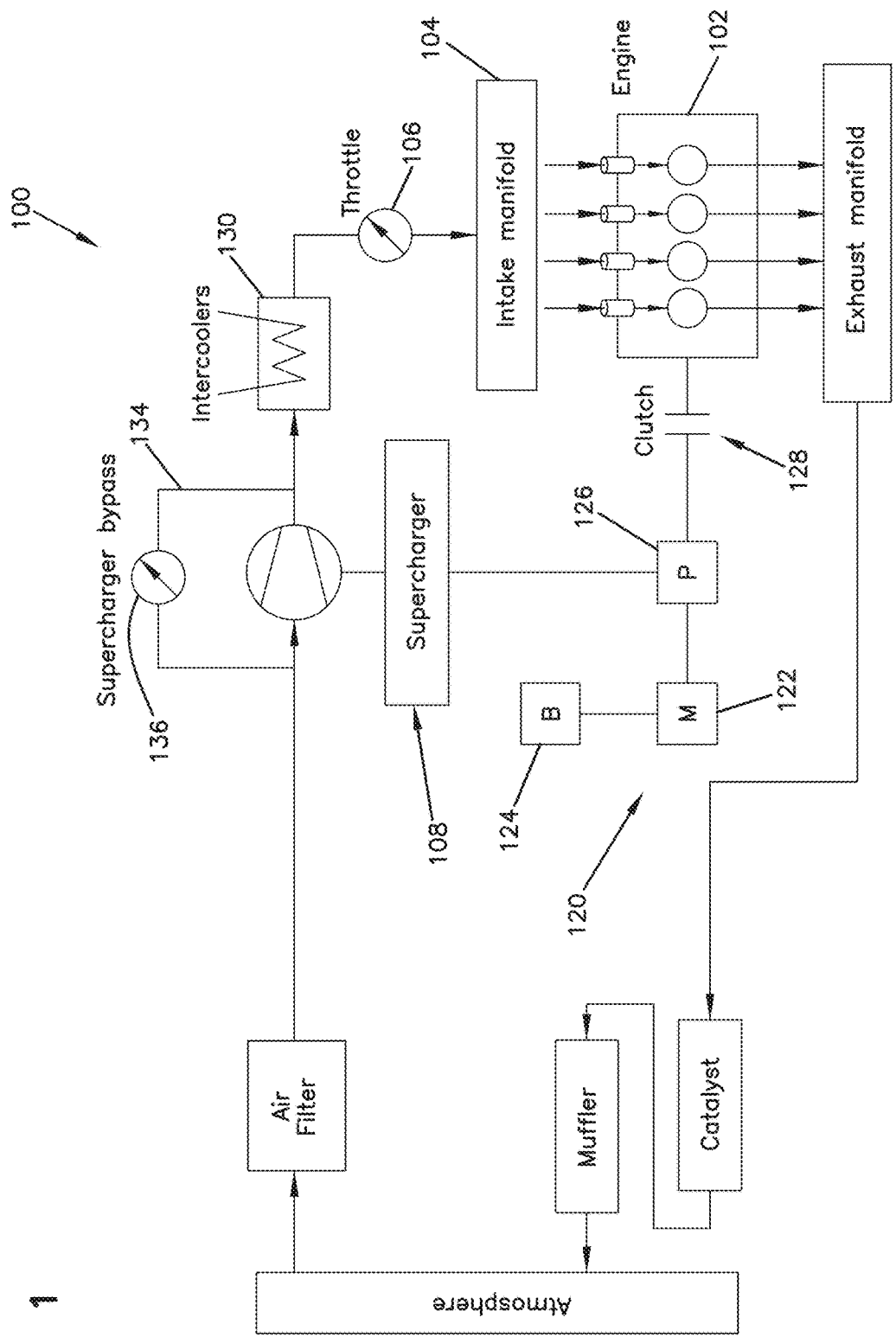
FIG. 1 is a system layout showing an example hybrid supercharger boost system in accordance with the principles of the present disclosure incorporated into an air intake system of an engine.

FIG. 1 illustrates an example boosting system 100 in accordance with the principles of the present disclosure. The boosting system 100 is configured to increase the boost pressure provided to an engine 102. In certain examples, the engine 102 can include a gasoline engine having an intake manifold 104 and a throttle 106. The boosting system 100 is also depicted including a supercharger 108. The supercharger 108 is positioned along an air intake of the engine 102. The supercharger 108 is powered by a hybrid drive system 120. The hybrid drive system 120 is configured to use torque mechanically transferred from the engine 102 (e.g., from the engine crankshaft) to drive the supercharger 108, and is also configured to use torque generated from an electric motor/generator 122 to provide torque to the supercharger 108. The electric motor/generator 122 can be powered by a battery 124 when functioning as an electric motor, and can be used to charge the battery 124 when functioning as a generator 122. In certain examples, the electric motor/generator 122 can interface with an electronic controller that controls operation of the electric motor/generator 122 in both the generating state and in the motoring state. The hybrid drive system 120 can further include a gear set such as a planetary gear set 126 that allows torque to be transferred between the supercharger 108, the electric motor/ generator 122 and the crankshaft of the engine 102. In certain examples, a clutch 128 can be provided for selectively coupling the planetary gear set to the engine and for decoupling the planetary gear set from the engine.

Referring still to FIG. 1, the boosting system 100 can include an intercooler 130 for cooling the intake air provided to the intake manifold 104. The boosting system 100 also includes a bypass line 134 that bypasses the supercharger 108. Flow through the bypass line 134 is controlled by a valve 136 that can open flow, close flow or proportion flow. In the depicted example, the throttle 106 is positioned between the supercharger 108 and the engine 102 such that the throttle 106 is positioned downstream from the supercharger 108. In other examples, the throttle can be positioned upstream from the supercharger 108.

In certain examples, the hybrid drive system 120 can be configured to provide the boosting system with various functions and can be operated in various modes. In certain examples, the hybrid drive system 120 can be provided with a brake for applying a braking force to the rotors of the supercharger 108 such that the rotors of the supercharger 108 are prevented from rotating. In such an example, with the supercharger brake open, the electric motor/generator 122 can be operated to vary the speed of the supercharger 108 to control and vary the boost rate based on the operating condition of the engine. This mode can be referred to as a variable speed boost mode. In this mode, torque from the electric motor/generator 122 can be used to boost the speed of the supercharger to a rate that is higher than can be achieved mechanically via torque from the engine crankshaft. In this mode, the electric motor/generator 122 can be operated as a generator and used to slow the speed of the supercharger to a speed slower than what would be provided mechanically via the gear ratio between the crankshaft and the supercharger input shaft. In this case, excess charge air is reduced and the battery can be recharged. In an engine start/stop mode, the supercharger brake can be locked and the electric motor 122 can provide torque to the engine for starting. With the supercharger brake locked, the system can be operated in a brake regeneration mode in which the electric motor/generator 122 is operated as a generator and is used to recover energy associated with braking (i.e., torque from the crankshaft is transferred to the motor/generator thereby slowing the engine during braking). With the supercharger brake locked, the boosting system can be operated in a torque assist mode in which the electric motor 122 is operated as a motor and is used to provide supplemental torque to the engine. With the supercharger brake locked, the hybrid drive system 120 can also be operated in an alternator mode in which the electric motor/generator functions as a generator and uses torque from the engine to charge the battery. It will be appreciated that further details relating to example hybrid drive systems that can be incorporated into the present boosting system are disclosed in U.S. Provisional patent application Ser. No. 11/776,834; U.S. Provisional Patent Application Ser. No. 61/776,837; and PCT Application No. PCT/US2013/003094, all of which are hereby incorporated by reference in their entireties.

Figure 2:
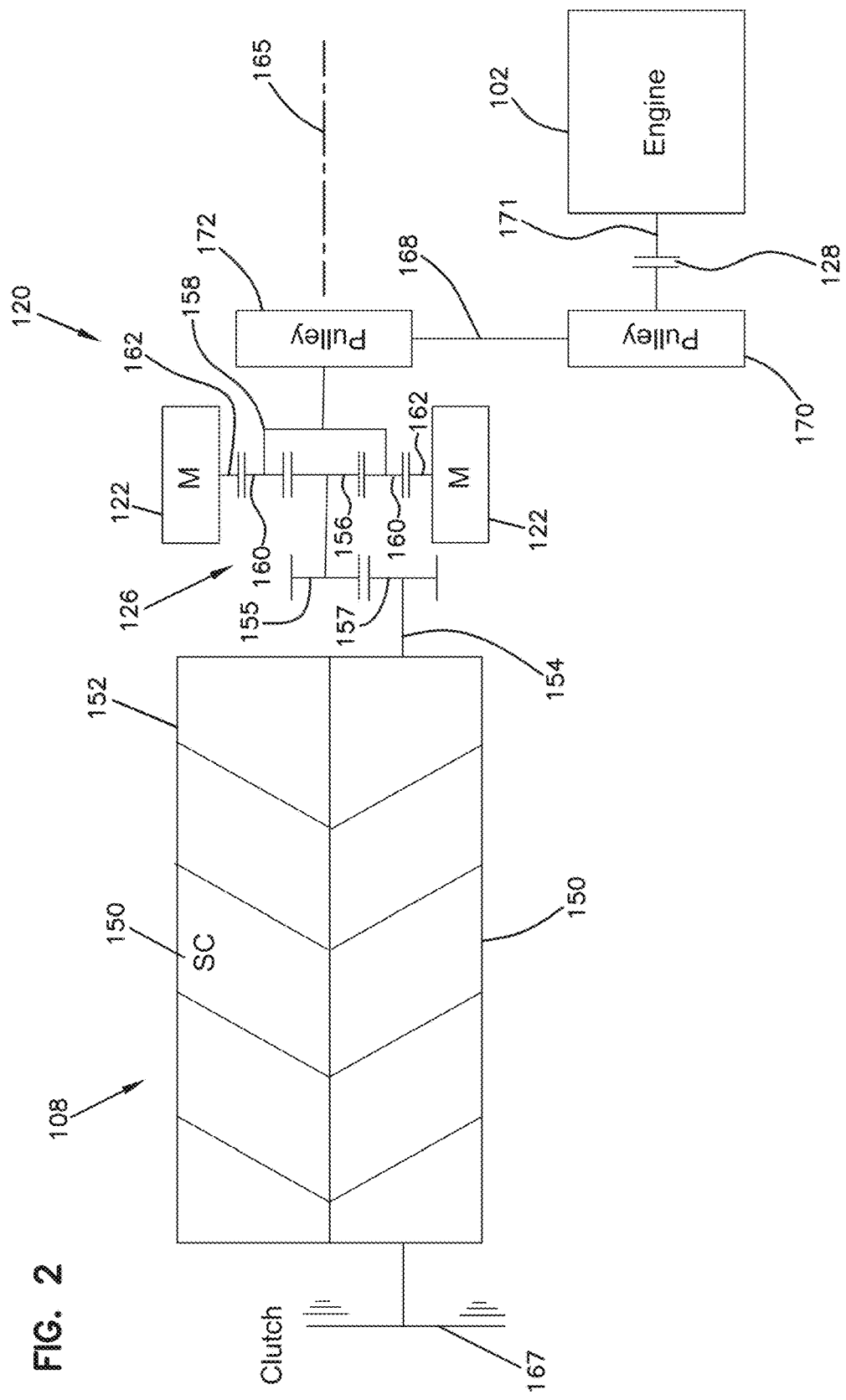
FIG. 2 schematically depicts a boost system including a hybrid drive in accordance with the principles of the present disclosure for powering a supercharger.

FIG. 2 illustrates an example configuration for a boosting system including the hybrid drive system 120. The boosting system includes the supercharger 108. The supercharger 108 includes intermeshed rotors 150 positioned within a supercharger housing 152. Timing gears can be provided for transferring torque between the rotors 150 and for ensuring that the rotors 150 rotate at the same speed. An input shaft 154 can supply torque to one of the rotors 150. In certain examples, the supercharger 108 can be a Roots-style supercharger that has a fixed air displacement for each rotation of the rotors 150. An example supercharger is disclosed at U.S. Pat. No. 7,488,164 that is hereby incorporated by reference in its entirety.

Still referring to FIG. 2, the planetary gear set 126 includes a sun gear 156 that is coupled to the input shaft 154 via intermeshing gears 155, 157, a carrier 158 that carries planetary gears 160 that surround and intermesh mesh with the sun gear 156, and a ring gear 162 that surrounds and intermeshes with the planetary gears 160. The ring gear 162, the carrier 158 and the sun gear 156 all can rotate about a common axis of rotation 165. The electric motor/generator 122 is shown integrated with the ring gear 162. In the depicted example, a drive shaft (e.g., a rotation member) of the electric motor/generator 122 is coupled directly to the ring gear 162 and is rotatable about the common axis 165 with the ring gear 162. In this way, the electric motor/generator 122 is in-line with or co-axially aligned with the supercharger. In one example, at least a portion of the electric motor/generator overlaps an axial end of the supercharger (e.g., radially overlaps at least one of the rotor chambers of the supercharger adjacent an axial end of the rotor housing). The hybrid drive system 120 also includes a belt 168 that transfers torque from a pulley 170 coupled to the crankshaft 171 of the engine 102 (e.g., either directly or via clutch 128) to a pulley 172 coaxially aligned with the axis of rotation 165. The pulley 172 is coupled to and rotates in unison with the carrier 158 about the axis 165. In this example, no intermediate motor pinion and no intermediate idler gear are used to transfer torque between the ring gear 162 of the planetary gear set 126 and the electric motor/generator 122. Thus, in this example, the drive shaft of the electric motor/generator 122 rotates in unison with the ring gear 162 about the same axis of rotation 165.

The hybrid drive system 120 further includes a brake 167 (e.g. a clutch style brake) for selectively braking at least one of the rotor shafts (e.g., the input shaft 154). By braking at least one of the rotor shafts, the sun gear is also braked. In one example, the brake 167 can be configured to ground at least one of the rotor shafts to the supercharger housing 152. In one example, the brake 167 can be configured to ground the rotor shaft to an end portion of the supercharger housing that defines an inlet of the supercharger and encloses the brake. In the depicted example, the brake 167 is positioned at an end of the supercharger housing 152 that is opposite from the end of the supercharger housing at which the planetary gear set, the timing gears and the electric motor/generator are mounted.

Figure 3:
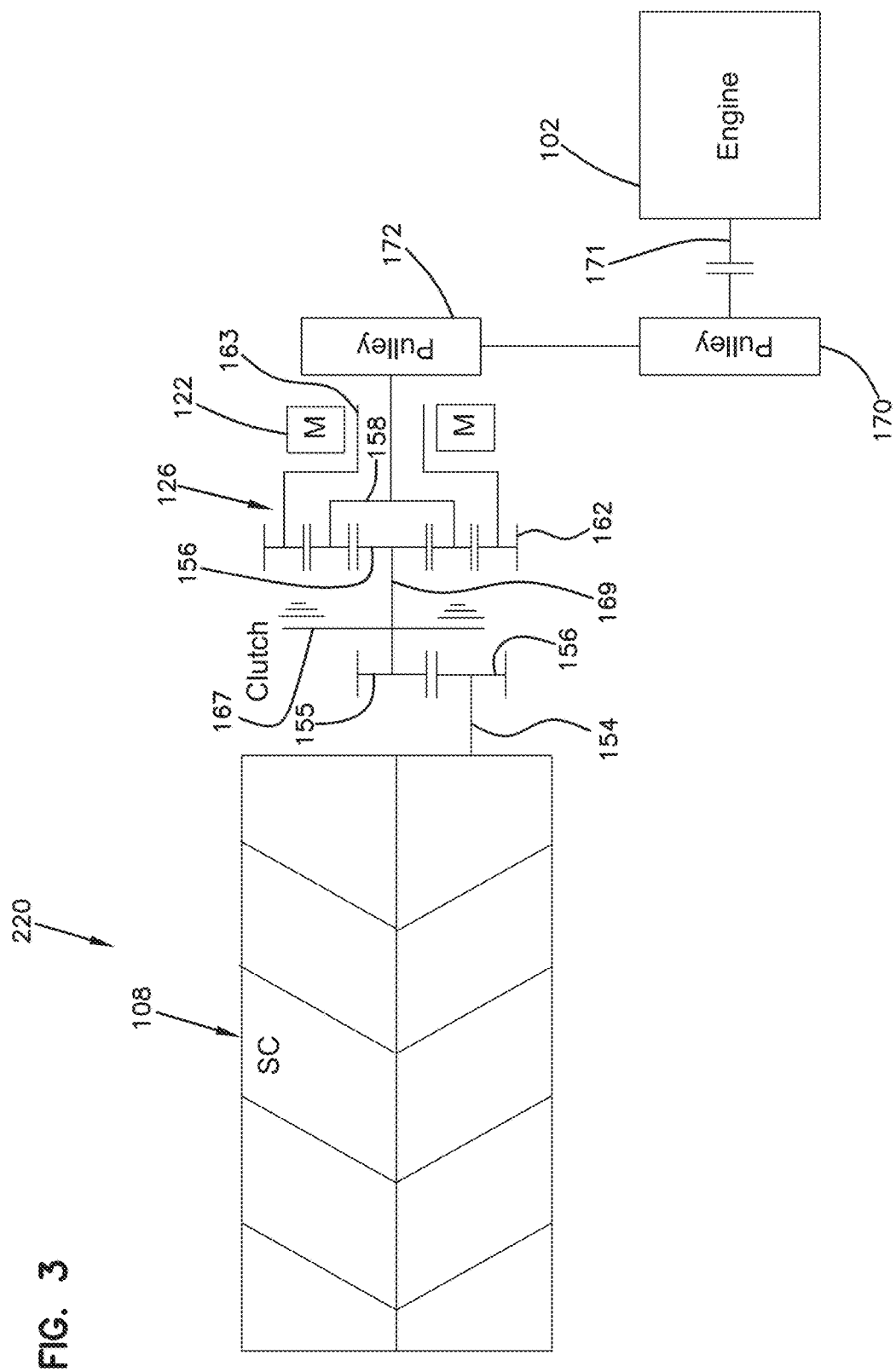
FIG. 3 schematically depicts another boost system including a hybrid drive in accordance with the principles of the present disclosure for powering a supercharger.

FIG. 3 shows another boosting system including a hybrid drive system 220 that has the same components as the hybrid drive system 120 except the brake 167 has been moved to the opposite end of the supercharger housing adjacent the planetary gear set. In the depicted example, of FIG. 3, the brake 167 is used to brake the shaft 169 that is coupled to and co-axial with the sun gear 156. In this way, rotation of the sun gear 156 about the axis 165 is braked and concurrently rotation of the supercharger rotors about their respective axes is braked. The brake 167 can ground the shaft 169 to the housing enclosing the planetary gear set 126. The electric motor/generator 122 is integrated between the sun gear 156 and the pulley 172 along the axis 165 and a rotation member 163 (e.g., the drive shaft) of the motor 122 is coupled directly to the ring gear 162.

Figure 4:
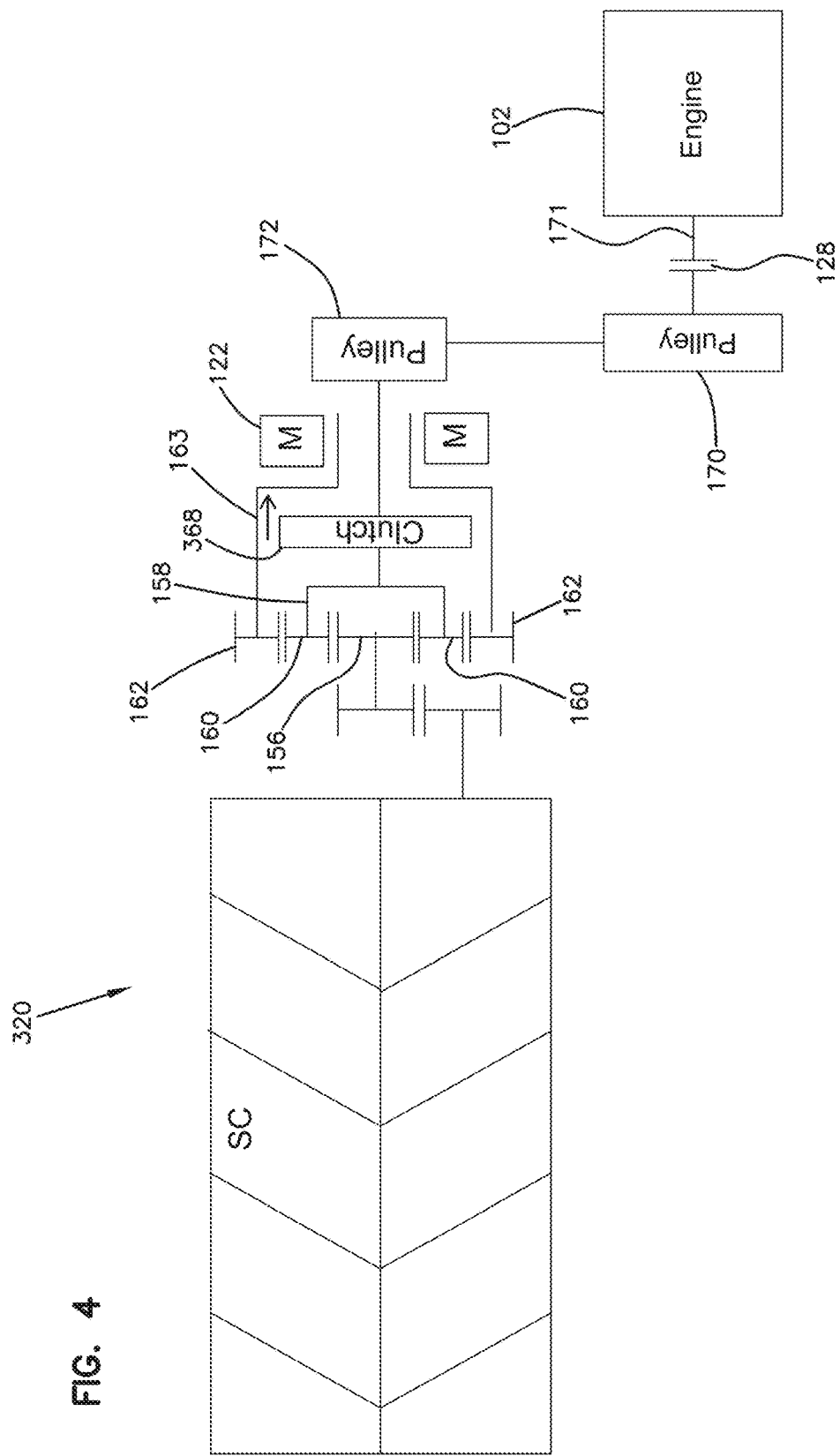
FIG. 4 schematically depicts a further boost system including a hybrid drive in accordance with the principles of the present disclosure for powering a supercharger.

FIG. 4 shows a further boosting system having a hybrid drive system 320 that has the same basic components as the hybrid drive systems 120, 220 except a brake 368 is provided for braking between the ring gear 162 and the carrier 158 so as to resist or limit relative rotation between the ring gear 162 and the carrier 158. The brake 368 is positioned along the axis 165 between the carrier 158 and the pulley 172. The brake allows torque to be transferred directly between the engine and the electric motor through the pulley 172

Figure 5:
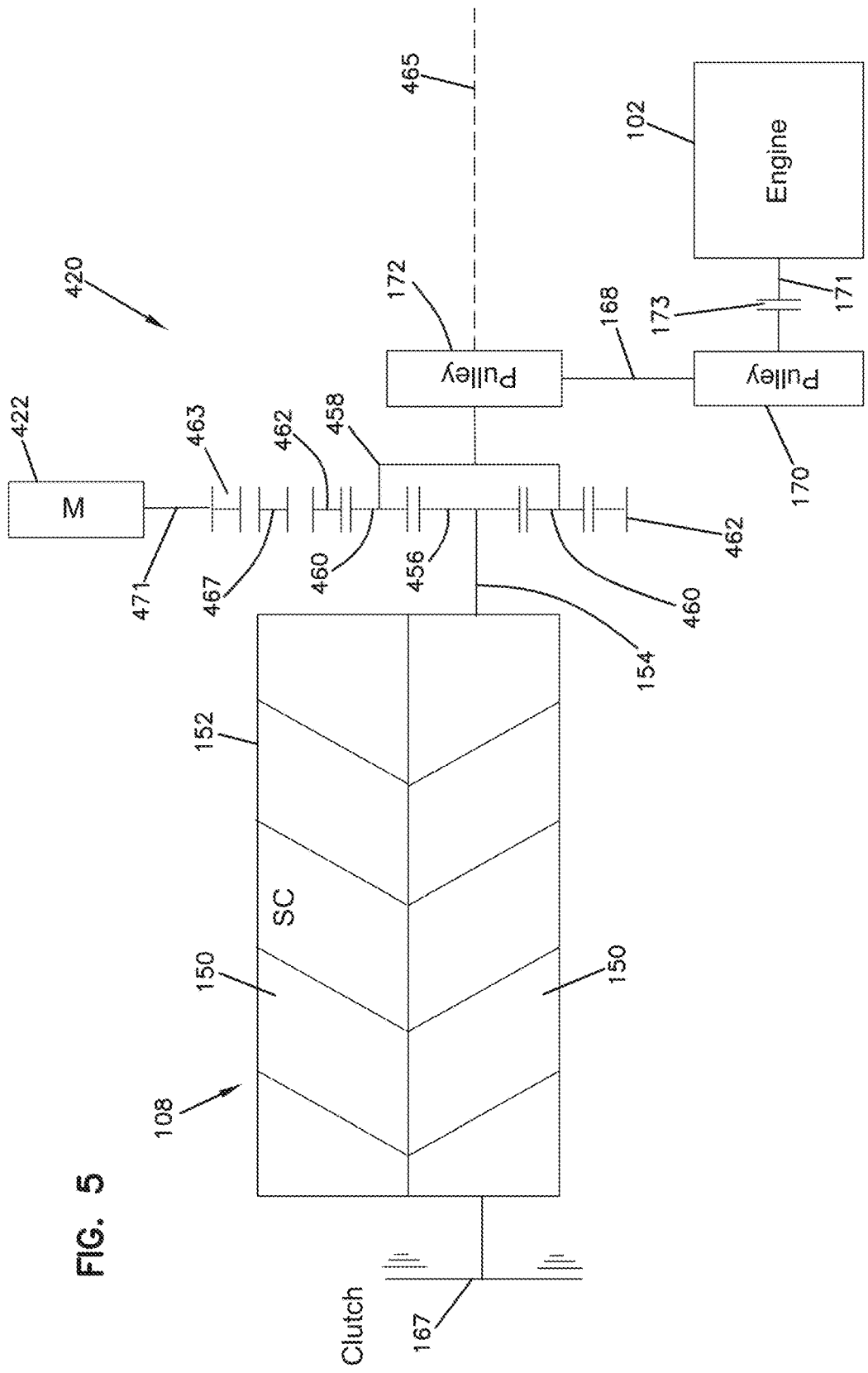
FIG. 5 schematically depicts an additional boost system including a hybrid drive in accordance with the principles of the present disclosure for powering a supercharger.

FIG. 5 shows another boosting system having a hybrid drive system 420. The boosting system includes the supercharger 108 with intermeshed rotors 150 positioned within a supercharger housing 152 and the input shaft 154. The hybrid drive system 420 includes a sun gear 456 that is coupled to the input shaft 154, a carrier 458 that carries planetary gears 460 that surround and intermesh mesh with the sun gear 456, and a ring gear 462 that surrounds and intermeshes with the planetary gears 460. The ring gear 462, the carrier 458 and the sun gear 456 all can rotate about a common axis of rotation 465. An electric motor/generator 422 is shown coupled to the ring gear 462 via intermediate intermeshing gears 463, 467. Selected gears from the planetary gear set and/or the intermeshing gears 463, 467 can include bevel gears (e.g., angled gears) integrated with the ring gear 462 so that a drive shaft 471 of the electric motor/generator 422 can be oriented at an angled (e.g., perpendicular) relationship relative to the axis 465. The hybrid drive system 420 also includes the belt 168 that transfers torque from the pulley 170 coupled to the crankshaft 171 of the engine 102 (e.g., either directly or via a clutch 173) to a pulley 172 coaxially aligned with the axis of rotation 465. The pulley 172 is coupled to and rotates in unison with the carrier 458 about the axis 465. The system 420 can provide the same functionality described above with respect to the earlier examples. The vertical orientation of the motor 422 can assist in packaging the system to be compatible with compact layouts. The hybrid drive system 420 further includes a brake 167 (e.g. a clutch style brake) for selectively braking at least one of the rotor shafts (e.g., the input shaft 154).

Figure 6:
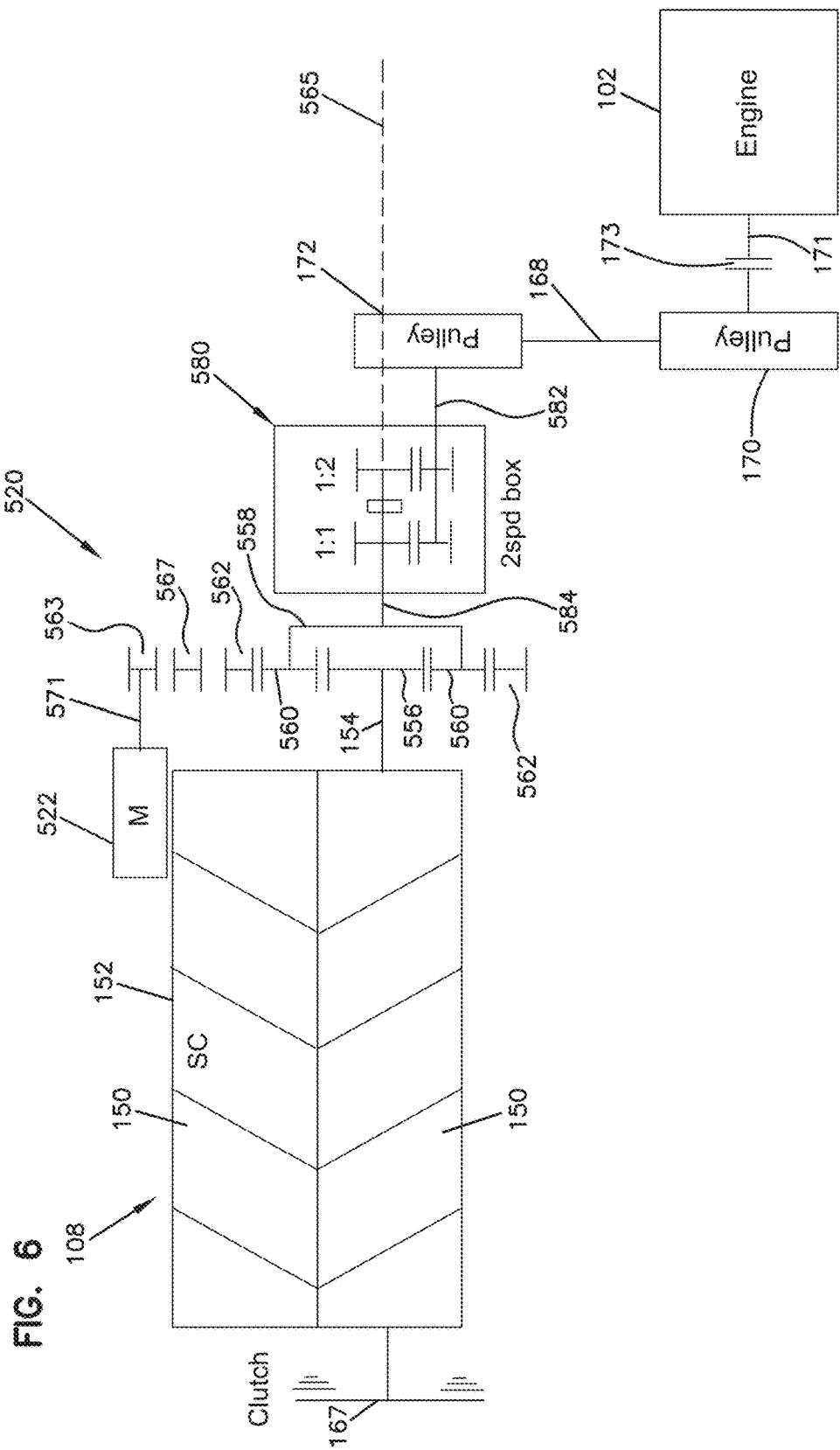
FIG. 6 schematically depicts a further boost system including a hybrid drive in accordance with the principles of the present disclosure for powering a supercharger.

FIG. 6 shows another boosting system having a hybrid drive system 520. The boosting system includes the supercharger 108 with intermeshed rotors 150 positioned within a supercharger housing 152 and the input shaft 154. The hybrid drive system 520 includes a sun gear 556 that is coupled to the input shaft 154, a carrier 558 that carries planetary gears 560 that surround and intermesh mesh with the sun gear 556, and a ring gear 562 that surrounds and intermeshes with the planetary gears 560. The ring gear 562, the carrier 558 and the sun gear 556 all can rotate about a common axis of rotation 565. An electric motor/generator 522 is shown coupled to the ring gear 562 via intermediate intermeshing gears 563, 567. The hybrid drive system 520 further includes a multi-speed gear set 580 that allows multiple gear ratios to be used to transfer torque between the crankshaft 171 and the planetary gear set. As a result, the gear set 580 can operate to change a speed of the supercharger 108, in particular, a rotational speed of the intermeshed rotors 150 positioned within the supercharger housing 152. The multi-speed gear set 580 has an input 582 coupled to the pulley 172 and an output 584 coupled to the carrier 558 to transfer torque between the carrier 558 and the pulley 172, and operates to switch gear ratios between the pulley 172 and the carrier 558. For example, the gear set 580 provides two ratios, 1:1 and 1:2, between the pulley 172 and the carrier 558. The gear set 580 can provide a prolonged duration of a boost operation even when there is no electrical energy is provided by, for example, the electric motor/generator 522. For example, when the motor/generator 522 is not in operation, the speed of the supercharger 108 can be increased by switching the gear ratio of the multi-speed gear set 580. The hybrid drive system 520 also includes the belt 168 that transfers torque from the pulley 170 coupled to the crankshaft 171 of the engine 102 (e.g., either directly or via a clutch 173) to a pulley 172. The system 520 can provide the same functionality described above with respect to the earlier examples, except for the multi-speed gear set 580. The hybrid drive system 520 further includes a brake 167 (e.g. a clutch style brake) for selectively braking at least one of the rotor shafts (e.g., the input shaft 154).

Figure 7:
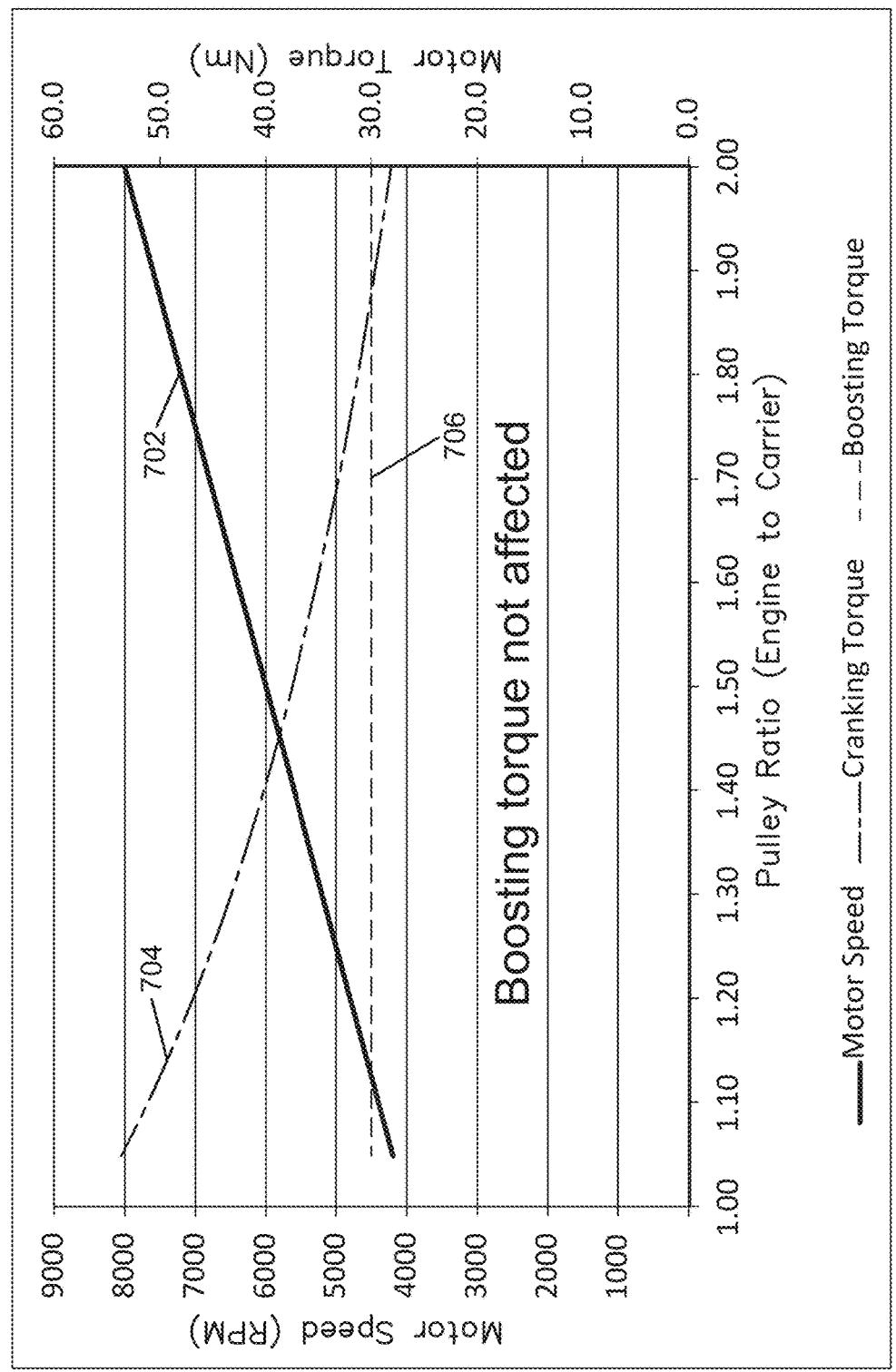
FIG. 7 is a graph showing a relationship between motor speed, motor torque and engine-to-carrier pulley ratio for the hybrid drive system of FIG. 2.

FIG. 7 shows a speed-torque relationship of the hybrid drive system 120 with respect to a pulley ratio between the engine 102 and the carrier 158. As depicted in FIG. 7, a motor speed 702 is generally in inverse proportion to a cranking torque 704. In particular, as the pulley ratio increases, the motor speed 702 increases, and the cranking torque 704 decreases. However, a boost torque 706, which is torque required for boosting operation with the supercharger 108, remains substantially the same when the pulley ratio changes. Therefore, while different pulley ratios can be used to change the cranking torque 704, they will not affect the boost torque 706 in the hybrid drive system 120.

Figure 8:
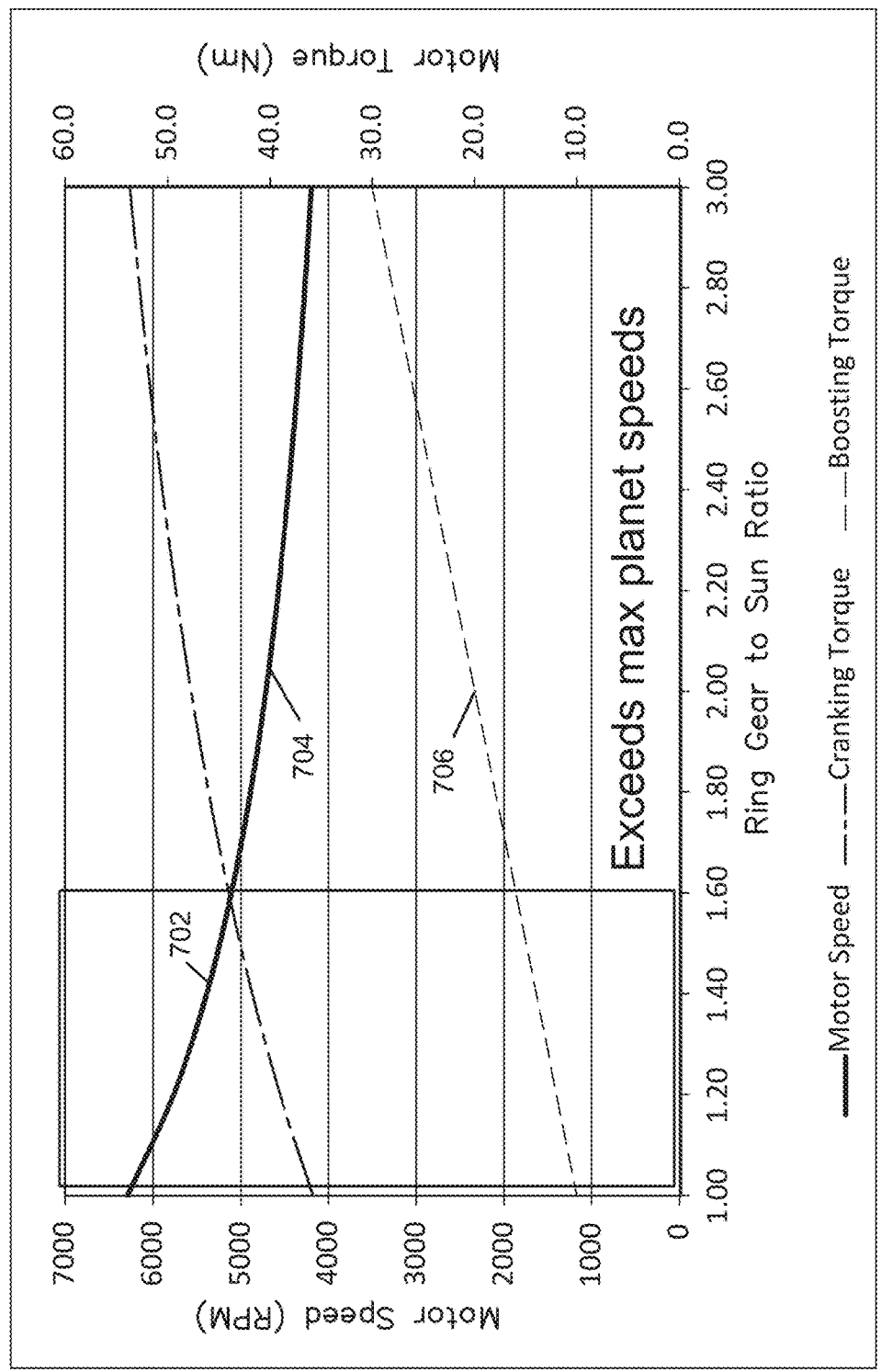
FIG. 8 is a graph showing a relationship between motor speed, motor torque and ring gear to sun gear ratio for the hybrid drive system of FIG. 2.

FIG. 8 shows a speed-torque relationship of the hybrid drive system 120 with respect to a ratio between the ring gear and the sun gear. As depicted in FIG. 8, as the ring-to-sun gear ratio increases, the cranking torque 704 and the boost torque 706 generally increase, and the motor speed 702 decreases. Therefore, the ring-to-sun gear ratio can be adjusted to change the boost torque 706 as is necessary for the hybrid drive system 120. Furthermore, if an engine cranking is not needed, it is possible to require only a low torque.

Figure 9:
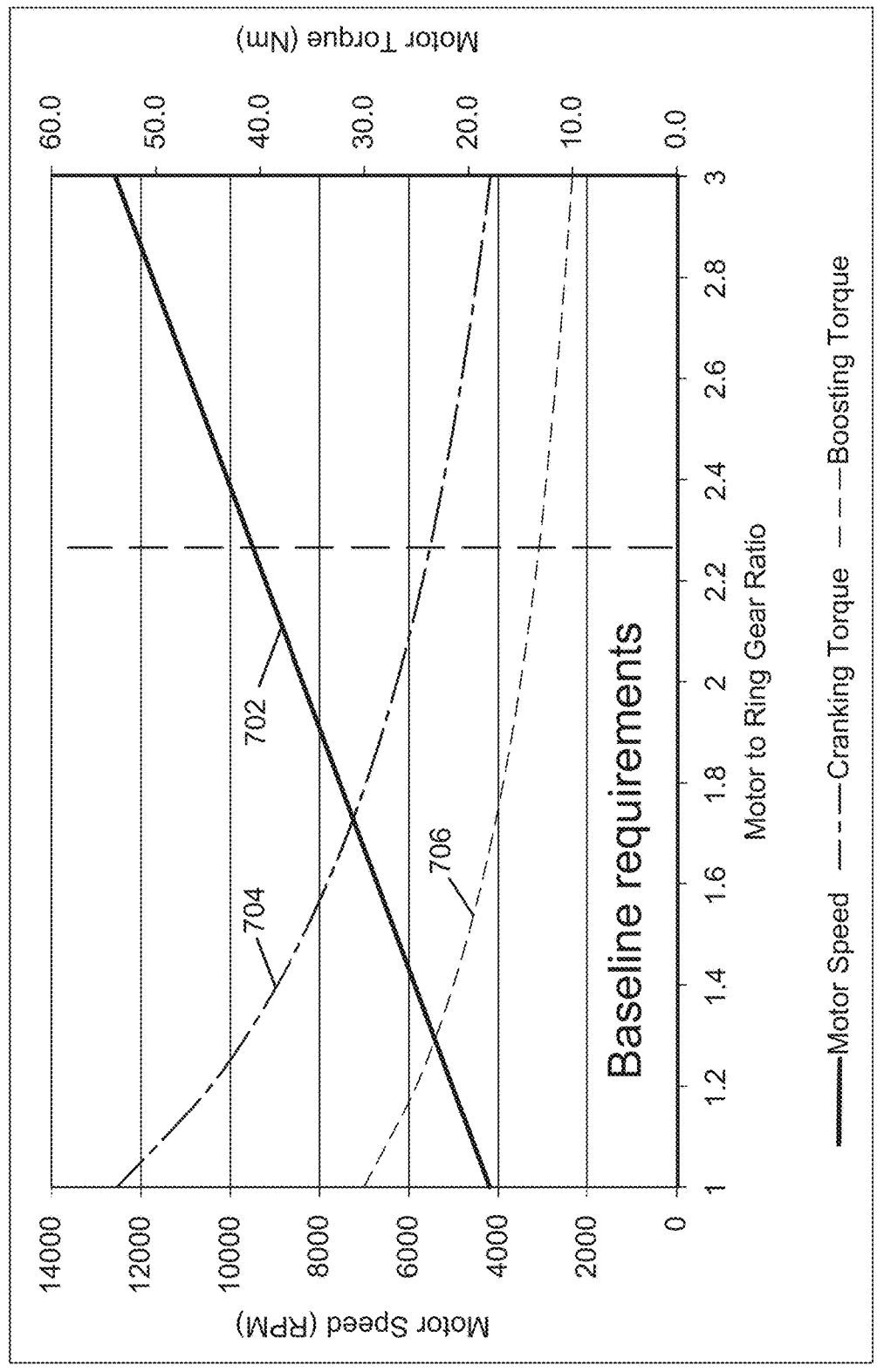
FIG. 9 is a graph showing a relationship between motor speed, motor torque and motor to ring gear ratio for the hybrid drive system of FIG. 2.

FIG. 9 shows a speed-torque relationship of the hybrid drive system 120 with respect to a motor-to-ring gear ratio. As depicted in FIG. 9, as the motor-to-ring gear ratio increases, the motor speed 702 increases, and the cranking torque 704 and the boost torque 706 generally decrease. Therefore, the motor-to-ring gear ratio can be adjusted to change the boost torque 706 as is necessary for the hybrid drive system 120. Furthermore, if an engine cranking is not needed, it is possible to require only a low torque.

Figure 12:
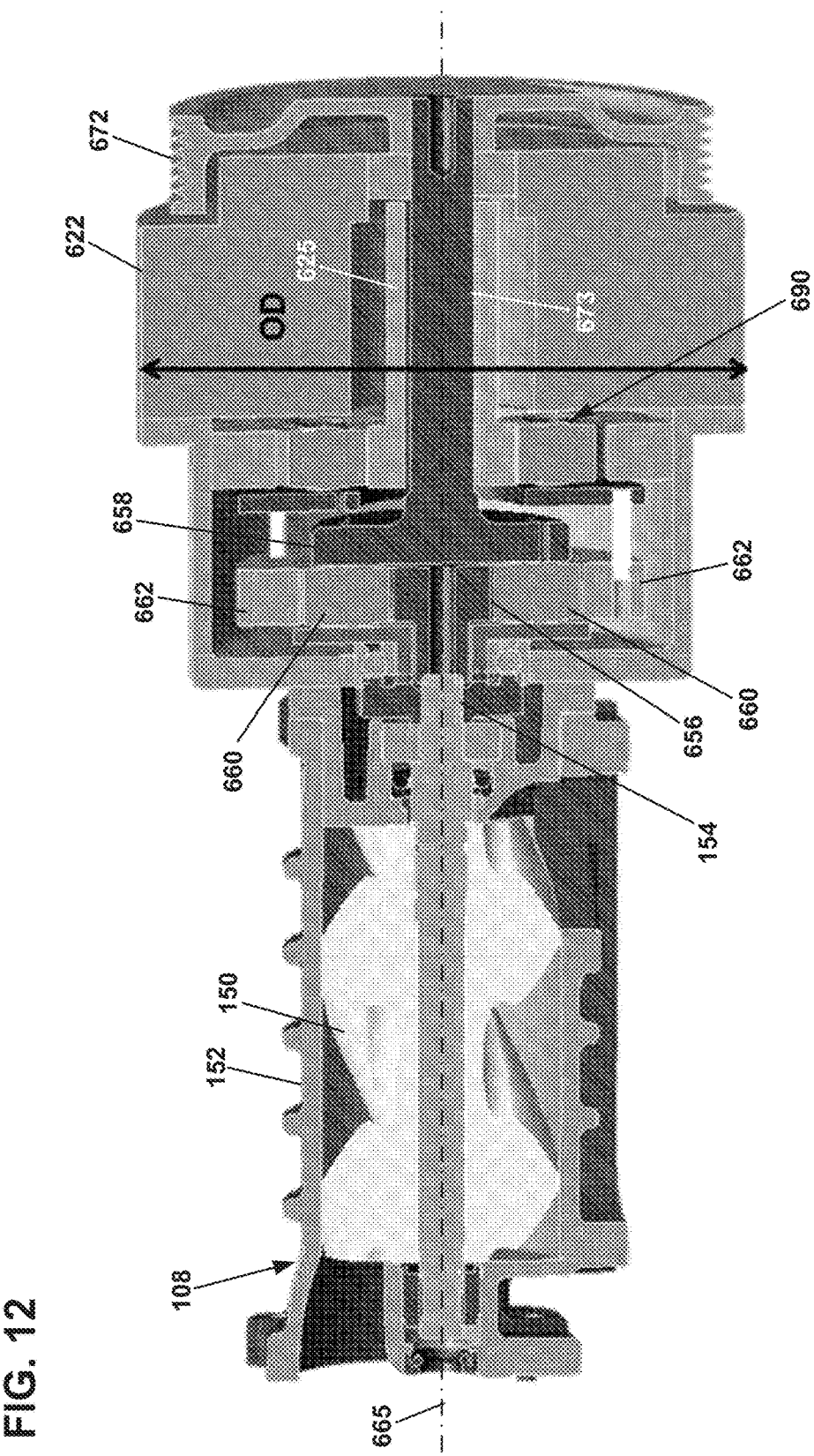
FIG. 12 is still another cross-sectional view showing the boost system of FIGS. 10 and 11.
Figure 13:
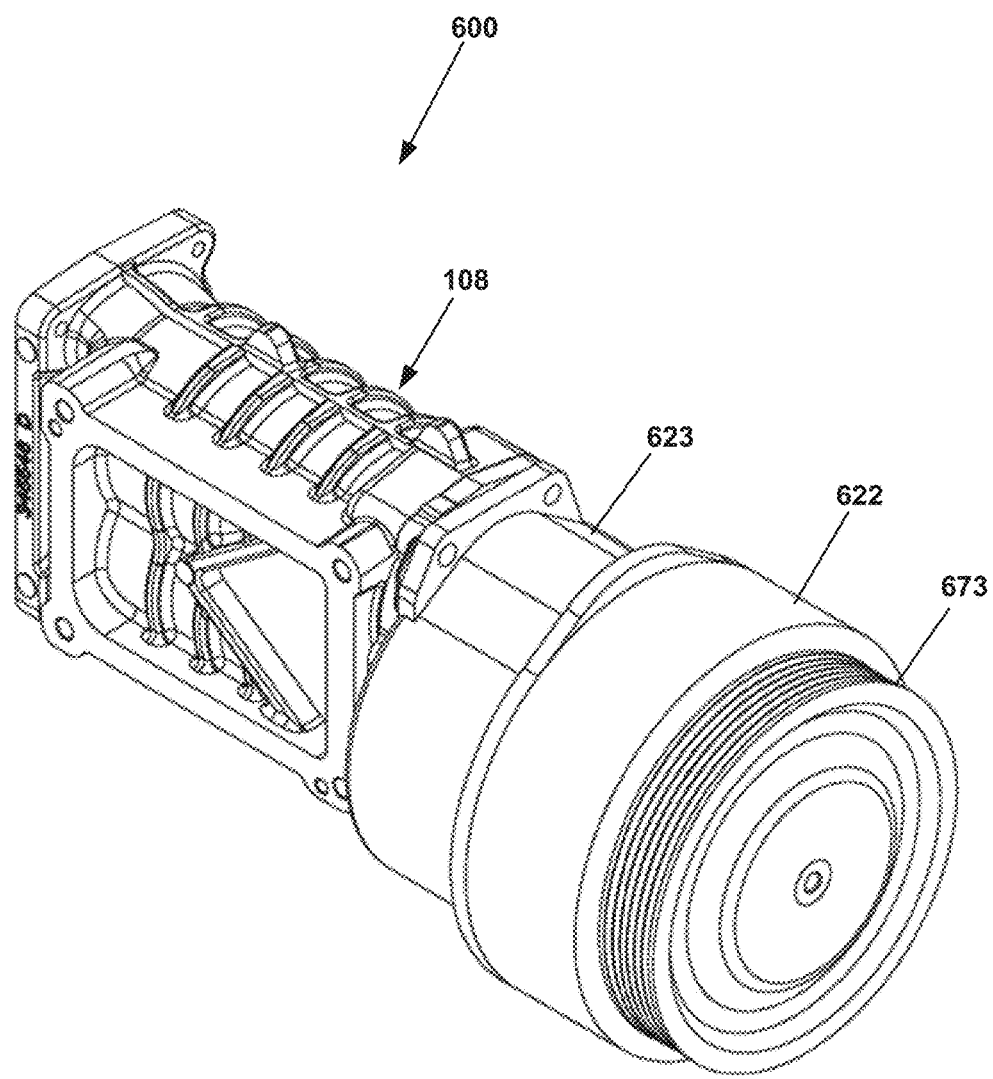
FIG. 13 is a front, top, left end perspective view of the boost system of FIGS. 10-12.
Figure 14:
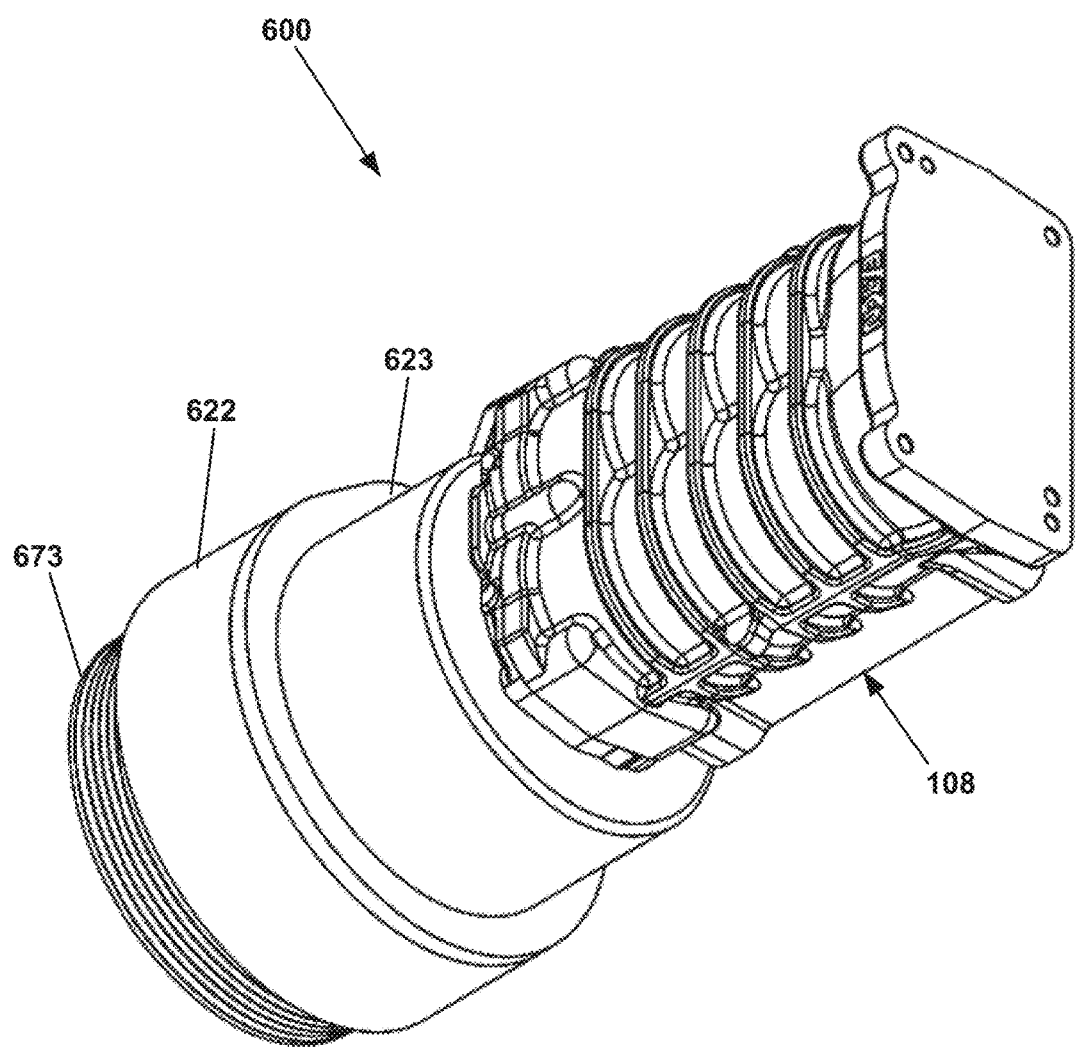
FIG. 14 is a rear, bottom, right end perspective view of the boost system of FIG. 13.
Figure 15:
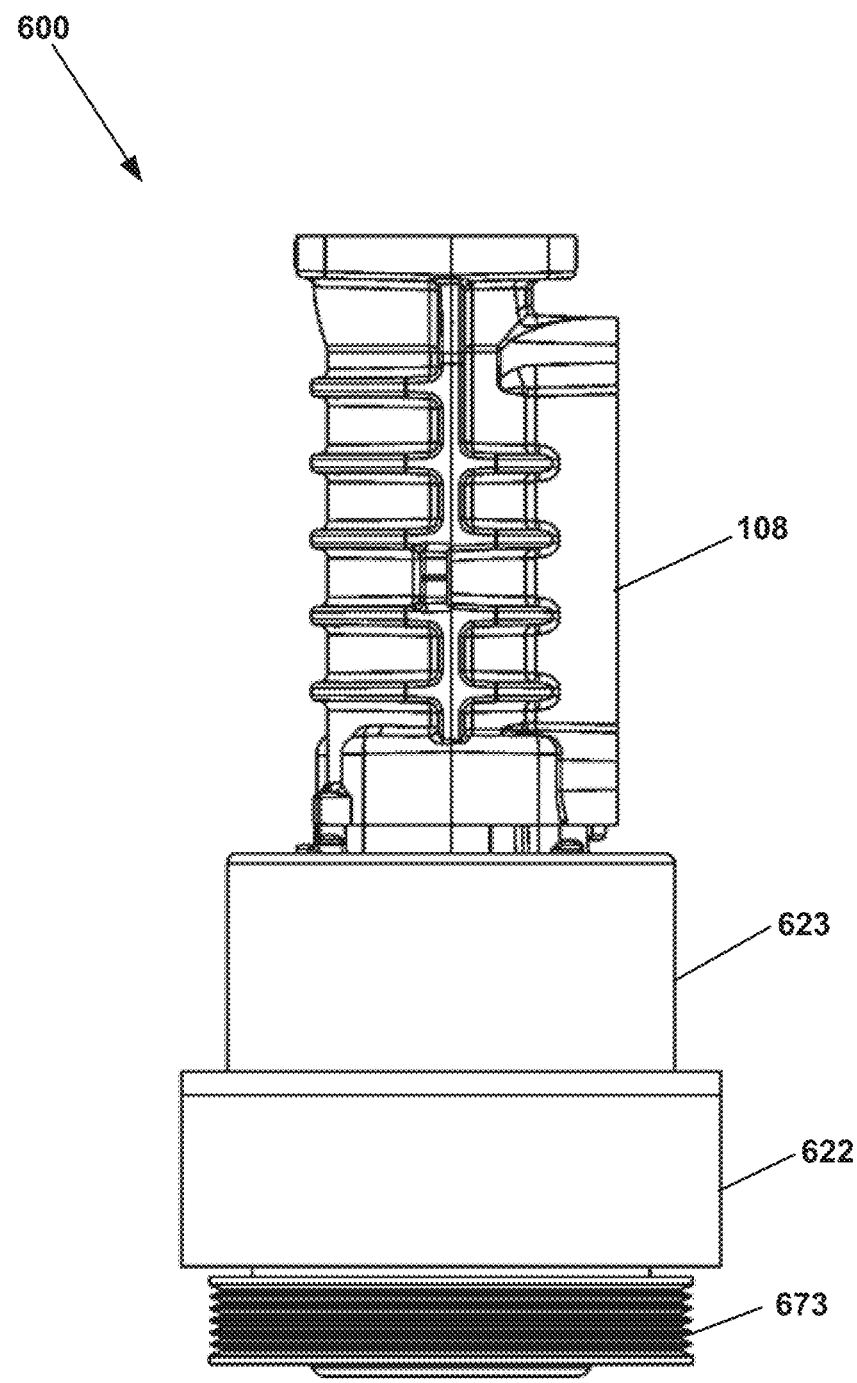
FIG. 15 is a bottom view of the boost system of FIG. 13.
Figure 16:
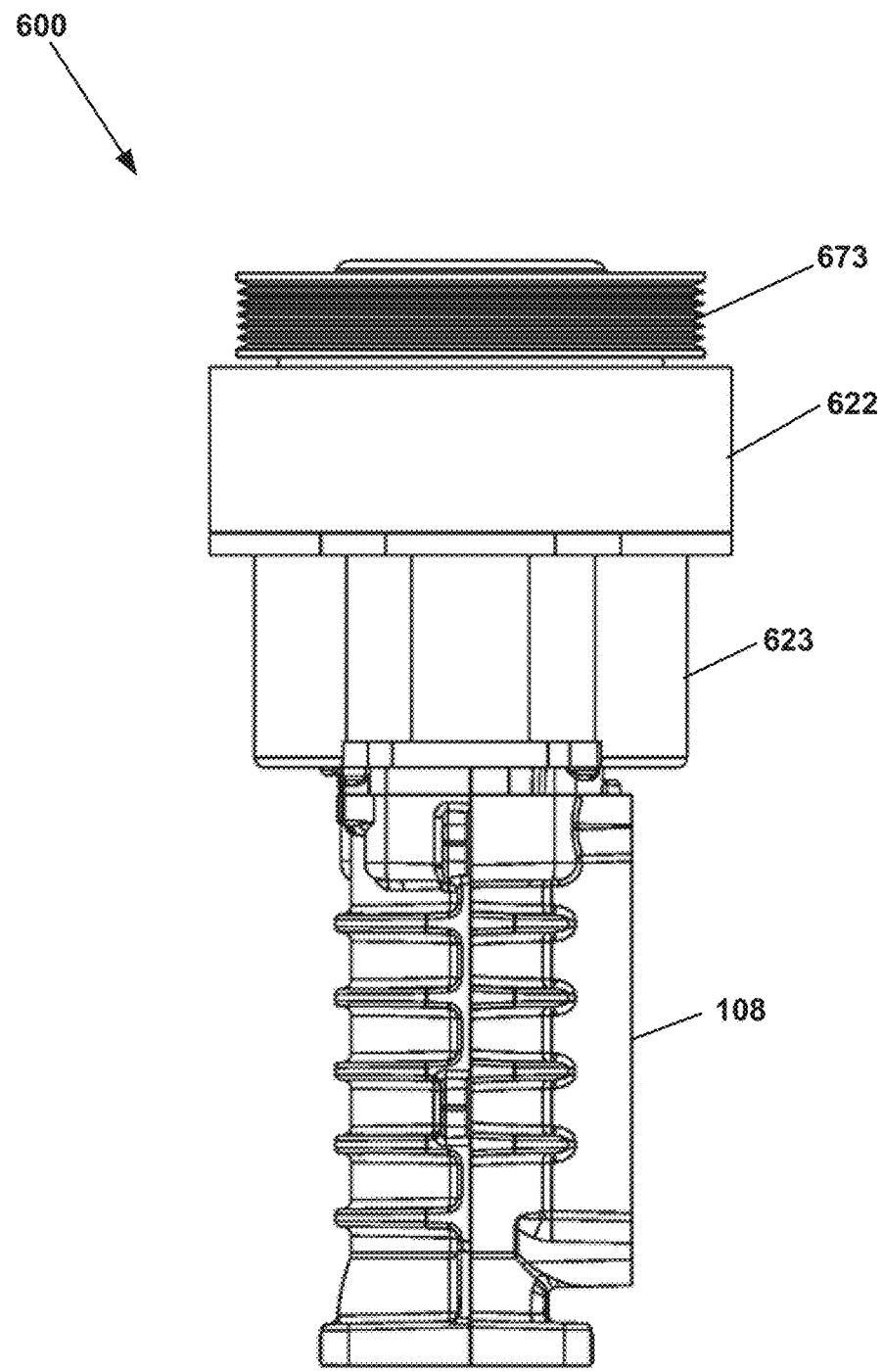
FIG. 16 is a top view of the boost system of FIG. 13.
Figure 17:
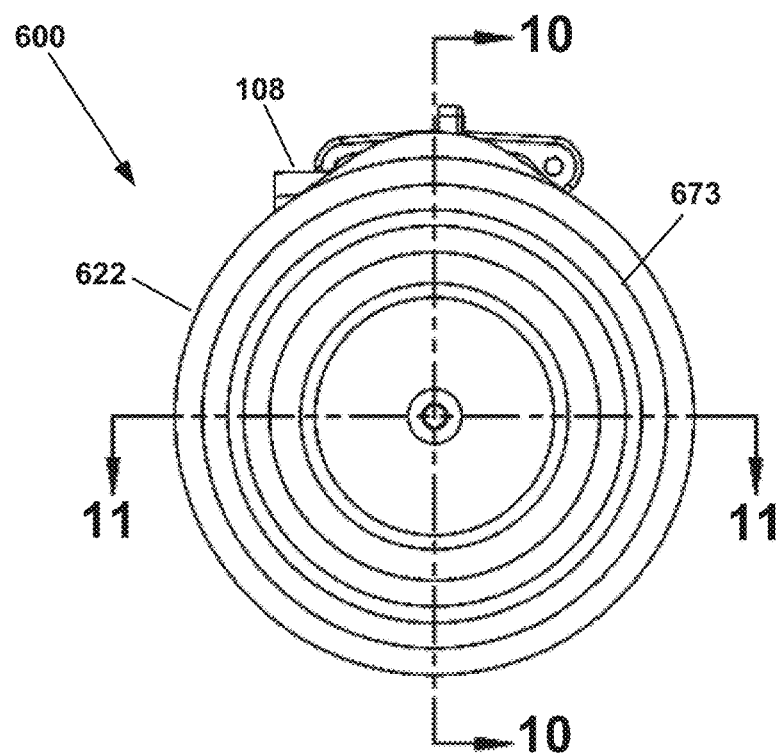
FIG. 17 is left end view of the boost system of FIG. 13.
Figure 18:
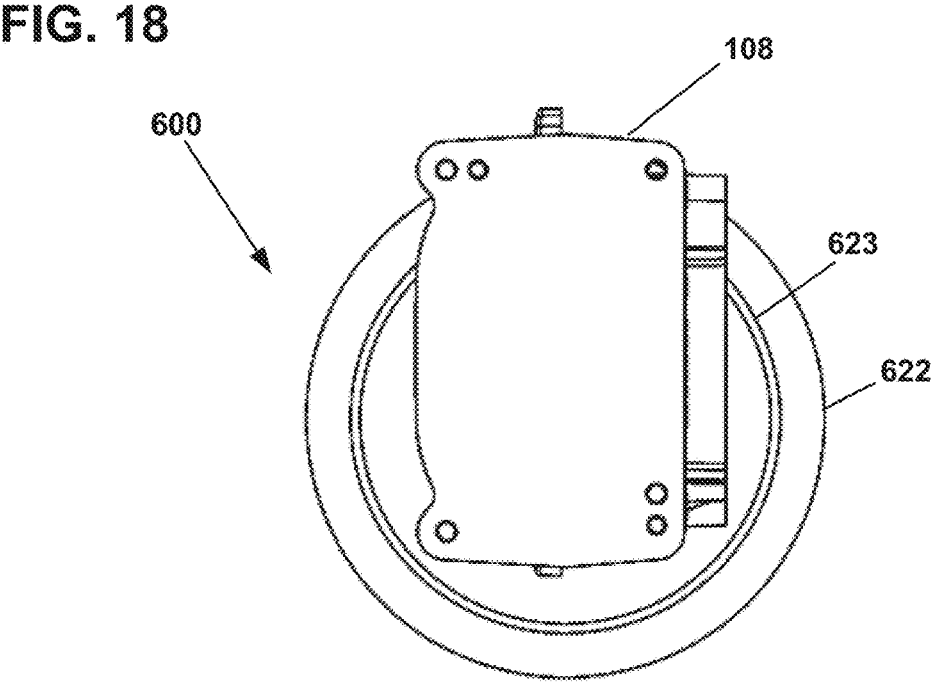
FIG. 18 is a right end view of the boost system of FIG. 13.
Figure 19:
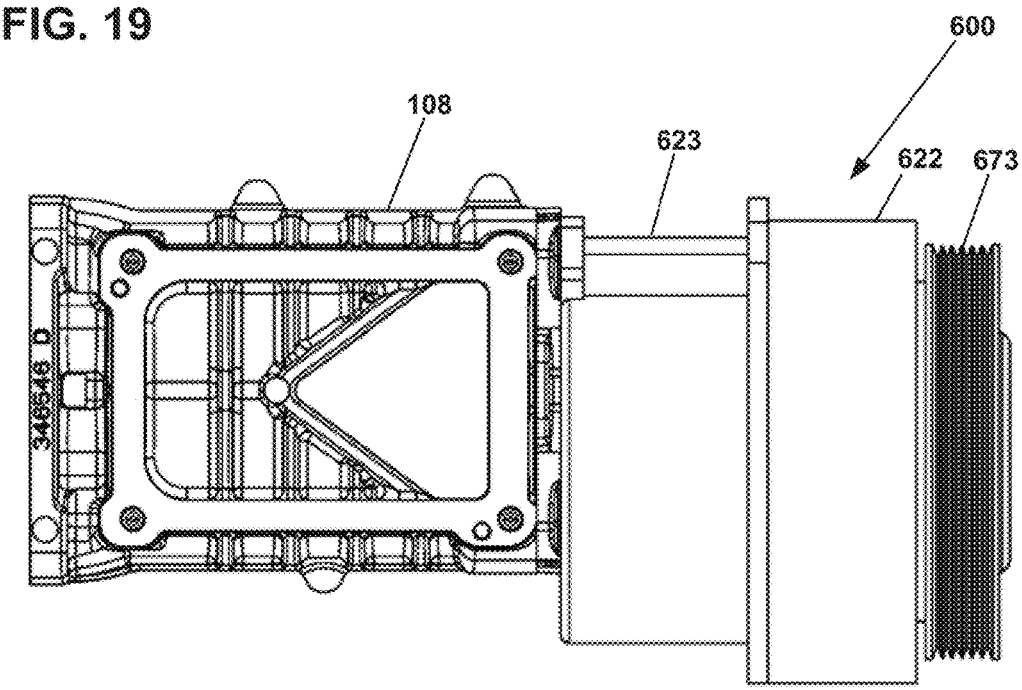
FIG. 19 is a front view of the boost system of FIG. 13.
Figure 20:
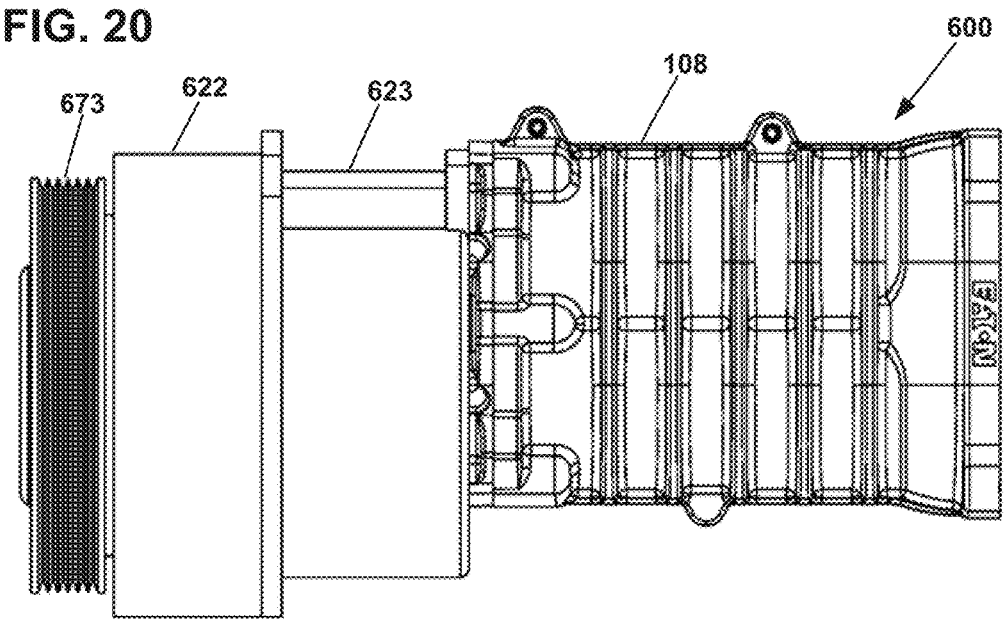
FIG. 20 is a rear view of the boost system of FIG. 13.

FIGS. 10-12 show a further boosting system 600 having a hybrid drive system 620 in accordance with the principles of the present disclosure. The boosting system 600 includes the supercharger 108 with intermeshed rotors positioned within the supercharger housing 152, and also includes the input shaft 154. The hybrid drive system 620 includes a first planetary gear set 621 positioned within a gear housing 623. The first planetary gear set 621 includes a sun gear 656 that is coupled to the input shaft 154 of the supercharger 108. The sun gear 656 can be coupled to the input shaft 154 either directly or by one or more intermediate gears such that torque can be transferred between the sun gear 656 and the input shaft 154. The planetary gear set 621 also includes a carrier 658 that carries planetary gears 660 that surround and intermesh with the sun gear 656. The first planetary gear set 621 also includes a ring gear 662 that surrounds and intermeshes with the planetary gears 660. The ring gear 662, the carrier 658 and the sun gear 656 all are adapted to rotate about a common central axis 665 of the first planetary gear set 621.

In certain examples, any of the brakes previously described herein can be incorporated into the hybrid drive system 620. For example, a braking device can be utilized to provide braking of the rotors of the supercharger, or braking of the sun gear 656, or to provide braking between the carrier 658 and the ring gear 662.

Referring still to FIGS. 10-12, the hybrid drive system 620 further includes a pulley 672 adapted to be coupled to the crankshaft of an engine. For example, the pulley 672 can be coupled by a belt to a corresponding pulley connected to the drive shaft of the engine. In this way, torque can be transferred between the pulleys. In certain examples, a clutch can be used to engage and disengage the transfer of torque between the pulleys and the crankshaft.

The pulley 672 is coupled to the carrier 658 by a torque transfer shaft 673. In the depicted example, the torque transfer shaft 673 is integrally coupled to the carrier 658. In this way, the torque transfer shaft 673, the carrier 658 and the pulley 672 all rotate in unison with one another about the central axis 665 of the first planetary gear set 621. The torque transfer shaft 673 functions to transfer torque between the pulley 672 and the carrier 658.

The boosting system 600 further includes an electric motor\generator 622 mounted between the pulley 672 and the gear housing 623. The gear housing 623 is mounted between the supercharger housing 152 and the electric motor\generator 622. The boosting system 600 has an axially-aligned configuration in which the supercharger 108, the gear housing 623, the electric motor\generator 622 and the pulley 672 are generally in align with one another in an axial direction. In certain examples, the planetary gear set 621, the pulley 672, and the electric motor\generator 622 are all aligned along the central axis 665. FIGS. 13-20 provide additional views showing how the various components of the boosting system 600 are generally axially aligned with one another.

Referring back to FIGS. 10-12, the electric motor\generator 622 includes a drive shaft 625 that is coaxially aligned with the central axis 665 and that is rotatable relative to the central axis 665. The drive shaft 625 is hollow and the torque transfer shaft 673 is shown passing through the hollow interior of the drive shaft 625. The drive shaft 625 and the torque transfer shaft 673 are rotatable relative to one another about the central axis 665 of the first planetary gear set 621.

The hybrid drive system 620 further includes a second planetary gear set 690. The second planetary gear set 690 includes a sun gear 691 coupled to the drive shaft 625. In the depicted example, the sun gear 691 is integrally connected with the drive shaft 625 such that torque is transferred between the sun gear 691 and the drive shaft 625. Thus, it will be appreciated that the drive shaft 625 and the sun gear 691 are configured to rotate in unison with one another about the central axis 665. The second planetary gear set 690 also includes a carrier 692 that carries a plurality of planetary gears 693 that surround and intermesh with the sun gear 691. The second planetary gear set 690 further includes a ring gear 694 that surrounds and intermeshes with the planetary gears 693. The planetary gears 693 can be rotatably connected to the carrier 692 by pins. The ring gear 694 is preferably grounded so as to be prevented from rotating about the central axis 665. For example, the ring gear 694 can be fixed relative to the gear housing 623. The ring gear 694 is coaxially aligned with the central axis 665, and the sun gear 691 and the carrier 692 are configured to rotate about the central axis 665.

Referring to FIG. 11, the carrier 692 is coupled to the ring gear 662 of the first planetary gear set 621. In certain examples, the carrier 692 is coupled to the ring gear 662 of the first planetary gear set 621 such that torque is transferred between the two components and the two components rotate in unison with one another about the central axis 665. As depicted at FIG. 11, pins 695 can be used to couple the carrier 692 to the ring gear 662. The second planetary gear set 690 is configured to allow torque to be transferred in either direction between the first planetary gear set 621 and the electric motor\generator 622. Thus, torque can be output from the electric motor\generator 622 to the first planetary gear set 621 for driving the supercharger 108 or for providing torque to the crankshaft of the engine. Also, torque can be transferred from the first planetary gear set 621 to the electric motor\generator 622 for driving the electric motor\generator 622 to allow electricity to be generated for charging a corresponding battery used to power the electric motor\generator 622. The second planetary gear set 690 and the pins 695 allow the electric motor\generator 622 to drive the ring gear 662 of the first planetary gear set 621 about the central axis 665. It will be appreciated that the electric motor\generator 622 can drive the ring gear 662 in either direction about the central axis 665.

From the forgoing detailed description, it will be evident that modifications and variations can be made in the aspects of the disclosure without departing from the spirit or scope of the aspects.

What is claimed is:

1. A boost system for providing boost pressure to an air intake manifold of an engine, the boost system comprising:
    a supercharger having rotors and a supercharger input shaft;
    an electric motor/generator including a hollow drive shaft;
    a planetary gear set for transferring torque between the supercharger input shaft, the electric motor/generator and a crankshaft of the engine, the planetary gear set including a sun gear, a ring gear and a carrier that carries planetary gears, the carrier, the sun gear and the ring gear being configured to rotate about a central axis of the planetary gear set, and wherein the drive shaft of the electric motor/generator rotates about the central axis of the planetary gear set, wherein a torque transfer shaft coupled to the carrier passes through the hollow drive shaft of the electric motor/generator.

2. The boost system of claim 1, wherein the electric motor/generator is generally axially in-line with the planetary gear set and the supercharger.

3. The boost system of claim 1, further including a brake for braking rotation of the supercharger rotors.

4. The boost system of claim 3, wherein the planetary gear set is positioned at one end of the supercharger and the brake is positioned at an opposite end of the supercharger.

5. The boost system of claim 3, wherein the planetary gear set and the brake are positioned at one end of the supercharger.

6. The boost system of claim 2, wherein the sun gear is coupled to the supercharger input shaft.

7. The boost system of claim 6, wherein the carrier is coupled to a pulley that is coupled to the engine crankshaft.

8. The boost system of claim 7, wherein the electric motor is positioned along the central axis at a location between the sun gear and the pulley.

9. A boost system for providing boost pressure to an air intake manifold of an engine, the boost system comprising:
    a supercharger having rotors and a supercharger input shaft;
    an electric motor/generator including a drive shaft;
    a planetary gear set for transferring torque between the supercharger input shaft, the electric motor/generator and a crankshaft of the engine, the planetary gear set including a sun gear, a ring gear and a carrier that carries planetary gears, the carrier, the sun gear and the ring gear being configured to rotate about a central axis of the planetary gear set, and wherein the drive shaft of the electric motor/generator rotates about the central axis of the planetary gear set
wherein the electric motor/generator is generally axially in-line with the planetary gear set and the supercharger;
wherein the carrier is coupled to a pulley that is coupled to the engine crankshaft;
wherein the electric motor is positioned along the central axis at a location between the sun gear and the pulley;
wherein the carrier is coupled to the pulley by a torque transfer shaft aligned along the central axis of the planetary gear set, the drive shaft of the electric motor/generator being hollow and the torque transfer shaft passing through the drive shaft of the electric motor/generator, the torque transfer shaft and the drive shaft being rotatable relative to one another about the central axis of the planetary gear set, and the torque transfer shaft being adapted to rotate in unison with the carrier about the central axis of the planetary gear set.

10. The boost system of claim 9, wherein the planetary gear set is a first planetary gear set, wherein the boost system also includes a second planetary gear set including a sun gear adapted to rotate in unison with the drive shaft of the electric motor/generator, planetary gears that intermesh with the sun gear, a carrier that carries the planetary gears and a ring gear that intermeshes with the planetary gears, the carrier of the second planetary gear set being adapted to rotate in unison with the ring gear of the first planetary gear set.

11. The boost system of claim 10, wherein and the ring gear of the second planetary gear set is fixed relative to a housing that encloses the first and second planetary gear sets.

12. The boost system of claim 1, further comprising a brake for braking rotation between the ring gear and the carrier.

13. A boost system for providing boost pressure to an air intake manifold of an engine, the boost system comprising:
a supercharger having rotors and a supercharger input shaft;
an electric motor/generator;
a planetary gear set for transferring torque between the supercharger input shaft, the electric motor/generator and a crankshaft of the engine, the electric motor/generator being integrated with a ring gear of the planetary gear set via a hollow drive member of the electric motor/generator.

14. The boost system of claim 13, wherein the planetary gear set includes a sun gear, a ring gear and a carrier that carries planetary gears, wherein the carrier, the sun gear and the ring gear rotate about a central axis, and wherein the drive member of the electric motor/generator rotates about the central axis.

15. The boost system of claim 13, further including a brake for braking rotation of the supercharger rotors.

16. The boost system of claim 15, wherein the planetary gear set is positioned at one end of the supercharger and the brake is positioned at an opposite end of the supercharger.

17. The boost system of claim 15, wherein the planetary gear set and the brake are positioned at one end of the supercharger.

18. The boost system of claim 14, wherein the sun gear is coupled to the supercharger input shaft by intermeshing gears.

19. The boost system of claim 18, wherein the carrier is coupled to a pulley that is coupled to the engine crankshaft.

20. The boost system of claim 19, wherein the electric motor is positioned along the central axis at a location between the sun gear and the pulley.

21. The boost system of claim 14, further comprising a brake for braking rotation between the ring gear and the carrier.

22. A boost system for providing boost pressure to an air intake manifold of an engine, the boost system comprising:
a supercharger having rotors and a supercharger input shaft;
an electric motor/generator;
a planetary gear set for transferring torque between the supercharger input shaft, the electric motor/generator and a crankshaft of the engine, the planetary gear set including a ring gear coupled to the electric motor/generator, a sun gear coupled to the supercharger input shaft, and a carrier coupled to a pulley that couples to the engine crank shaft, the ring gear, the sun gear and the carrier being rotatable abut a central axis;
a clutch connected to the supercharger input shaft at a location such that the rotors are between the clutch and the planetary gear set and
the electric motor/generator having a rotation member that rotates about a motor axis that is perpendicular relative to the central axis.

23. The boost system of claim 22, further comprising at least one bevel gear for transferring torque between the ring gear and the rotation member of the electric motor/generator.

24. The boost system of claim 23, further comprising a plurality of bevel gears for transferring torque between the ring gear and the rotation member of the electric motor/generator.

25. A boost system for providing boost pressure to an air intake manifold of an engine, the boost system comprising:
a supercharger having rotors and a supercharger input shaft;
an electric motor/generator;
a planetary gear set for transferring torque between the supercharger input shaft, the electric motor/generator and a crankshaft of the engine, the planetary gear set including a ring gear coupled to the electric motor/generator via a hollow drive shaft, a sun gear coupled to the supercharger input shaft, and a carrier coupled to the crankshaft via a torque transfer shaft passing through the hollow drive shaft, the ring gear, the sun gear and the carrier being rotatable abut a central axis; and
a multi-speed gear set for allowing multiple gear ratios to be used to transfer torque between the crankshaft and the planetary gear set.

26. The boost system of claim 25, further comprising a pulley that is coupled to the engine crankshaft, and wherein the multi-speed gear set transfers torque between the carrier and the pulley.

27. The boost system of claim 26, further comprising a brake for braking the supercharger input shaft.

* * * * *